United States Patent Office 2,762,528
Patented Sept. 11, 1956

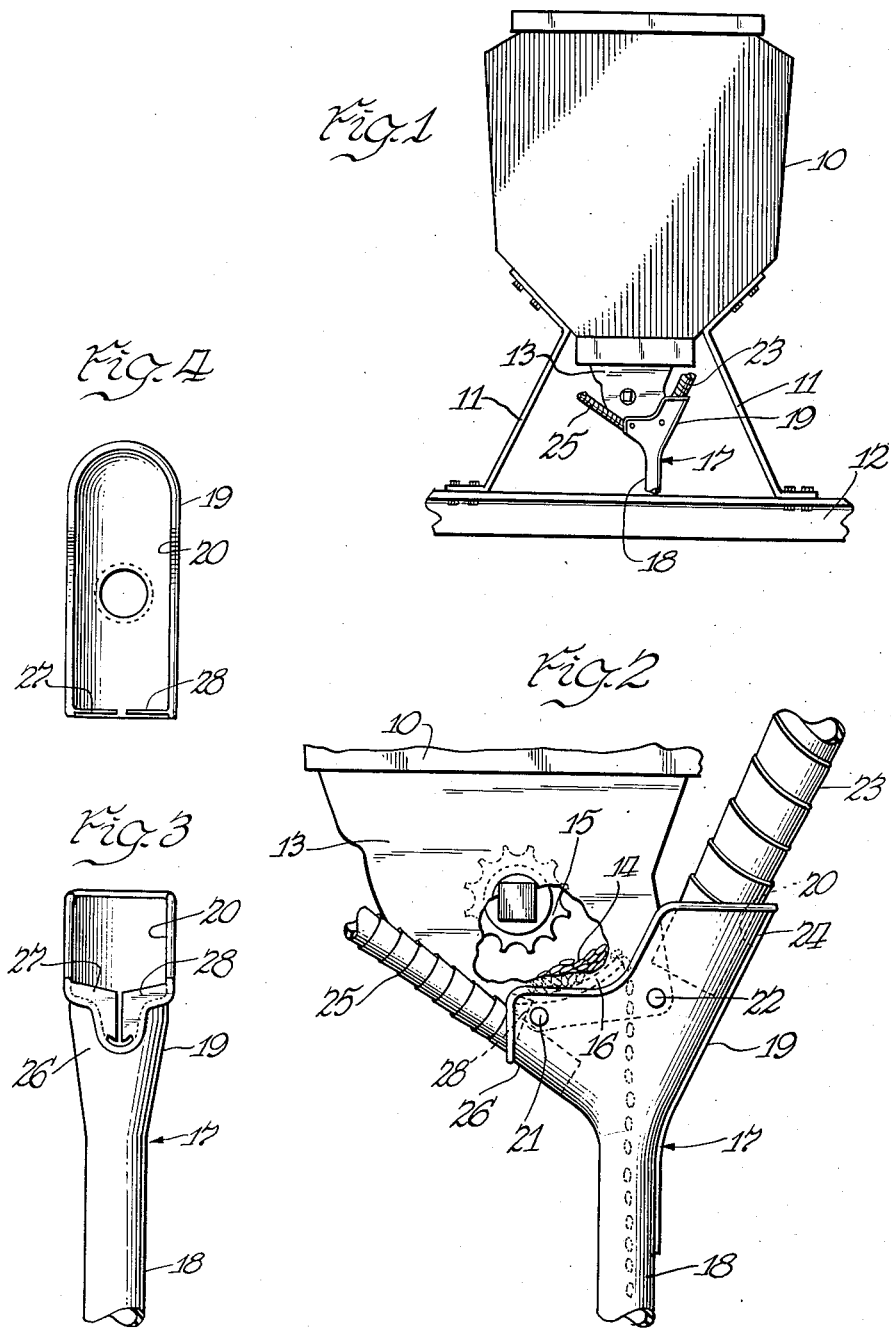

2,762,528

GRAIN DRILL FEED TUBE

Ronald E. Penfold, Aldershot, Ontario, Canada, assignor to International Harvester Company, a corporation of New Jersey Application February 13, 1953, Serial No. 336,815

5 Claims. (Cl. 222—132)

This invention relates to agricultural implements and particularly to grain drills and the like. More specifically the invention concerns novel discharge and guiding mechanism for the seed and fertilizer or other material to be directed to the soil.

A grain drill comprises generally an elongated hopper for the grain to be discharged, mounted upon a wheeled frame and extending transversely of the direction of travel of the propelling vehicle. Earth-working elements to prepare a bed for the seed or other material to be discharged to the ground are mounted upon the machine below the hopper and at spaced locations transversely thereof, these earth-working units being capable of moving vertically relative to the frame to conform to changes in ground contour. These units are connected to the discharge mechanism on the hopper by usually flexible metal tubes which accommodate a certain amount of floating movement of the earth-working units. The flexible metal tube is also connected to a metal receiver or enlarged discharge member adapted to be attached to the outlet of the hopper. Due to the character of the receiver and guide elements, parts of the discharge mechanism are frequently damaged due to the telescoping movement of the tube. The principal object of the present invention is, therefore, the provision of improved mechanism for directing seed and the like from an implement, such as a grain drill, to the furrow formed by earth-working mechanism carried by the implement.

Another object of the invention is the provision of a combination receiver and guide tube for discharging grain and fertilizer or the like from a hopper wherein relative movement between the grain tube and its receiver is prevented by molding the two parts out of flexible material as a unit.

It is customary with operators of grain drills to also mount upon the implement auxiliary hoppers containing a different type of seed, such as grass seed, and fertilizer. While the guide tube receiver is connected directly to the grain box outlet, feed tubes are provided for directing the other kind of seed and the fertilizer to the receiver. Additional openings are, therefore, provided in the receiver, usually in the front and rear thereof for the reception of seed and fertilizer. When these auxiliary hoppers are not in use, however, air gets into the receiver and frequently blows the light grain through one of the openings at the front or rear.

Another object of the invention is, therefore, the provision of improved means for preventing the loss of seed through the receiver when the auxiliary hoppers are not in use.

Other objects and advantages of the invention will become clear from the following detailed description when read in conjunction with the accompanying drawings, wherein:

Figure 1 is a diagrammatic view in end elevation of a grain drill hopper and a portion of the frame of the machine having the novel combination grain tube and receiver construction of this invention mounted thereon;

Figure 2 is an enlarged detail of a portion of the structure shown in Figure 1;

Figure 3 is a detail of a portion of the grain-receiver and tube showing the closure by means of which the loss of grain through the receiver is prevented; and Figure 4 is a plan view of the structure shown in Figure 3.

Referring to the drawings it will be observed that the grain box or hopper is designated by the numeral 10 and that only one end of the box is shown. The grain box 10 is elongated and extends transversely of the direction of travel and is mounted by a plurality of brackets 11 upon a frame 12.

Grain placed in the hopper 10 flows into a plurality of feed cups 13, it being understood that feed cups 13 are located at intervals along the bottom of the box 10. It should be understood that the operation of the seed discharge mechanism within the feed cup 13 forms no part of this invention, but it should be noted that seed 14 fed by the wheel 15 passes over a lip 16 at the bottom of the feed cup and drops down into the funnel-like guiding member 17 which is adapted to receive the seed from the feed cup and direct it to the earth-working tools, not shown, of conventional form adapted to open a furrow in the soil for the reception of the seed. The guide means 17 is molded in one piece of a flexible material, preferably rubber, and consists of a lower tubular guide portion 18 and an outwardly flared upper receiving portion 19.

The receiver 19 is generally Y-shaped and is provided at its upper end with an opening 20 extending the entire width thereof, and is also provided with apertures on opposite sides thereof for the reception of spaced lugs 21 and 22 projecting laterally from opposite sides of the feed cup 13. The spacing between the openings in the receiver 19 is preferably somewhat less than the spacing between the lugs 21 and 22 so that some stretching of the material of which the receiver is made is required to register the apertures therein with these lugs, thus providing for the secure attachment of the guide means to the feed cup.

As pointed out before, auxiliary hoppers are frequently mounted upon the hopper 10 or the frame 12 of the grain drill for dispensing a different kind of seed such as grass seed and for also dispensing fertilizer. These auxiliary hoppers, not shown, may be of any suitable form and fertilizer may be discharged to the guiding device 17 through a flexible tube 23, the lower end of which is inserted into a part of the opening 20 formed in an arm 24 of the Y-shaped receiver 19 projecting forwardly from the feed cup 13. Grass seed or the like from the grass seed hopper is dispensed to the guide member 17 through another flexible tube 25, the lower end of which is received in a vertically disposed opening provided in another arm 26 of the Y-shaped receiver 19. This vertical opening in the rearward portion of the receiver 19 is a continuation of the opening 20 in the upper end thereof. In the absence of the auxiliary hoppers and the tubes 23 and 25, as pointed out before, air passing through the opening for the tube 23 blows the seed 14 back through the opening in the rear face of the receiver which is adapted to receive the grass seed tube. In order to avoid that eventuality and to accommodate entry of the seed tube 25 into its opening in the grain receiver, applicant has provided a pair of flaps or gates 27 and 28 projecting inwardly from opposite walls of the receiver portion 19 of the guide means and adapted to yield upon insertion of the tube 25. In the absence of the tubes 23 and 25, however, air entering the opening in the arm 24 of the receiver will not blow the seed 14 through the opening for the tube 25 by virtue of the provision of the flaps 27 and 28. These flaps 27 and 28 are molded integrally with the walls of the receiver adjacent one end of the opening 20 therein and are of the same resilient material as the receiver and the guide tube.

In operation or in transporting the grain drill of this invention, the vertical movement of the earth-working units does not transmit shock to the discharge mechanism of the hopper since the tube 18 simply flexes in the amount required.

The operation of the combined molded grain tube and receiver of this invention should be clear from the foregoing description. It may be understood, however, that modifications may be made in the invention without departing from the spirit thereof or the scope of the appended claims.

What is claimed is:

1. For use in seed dispensers including a hopper, a device comprising discharge means, a molded unitary seed-receiver and guide tube made of elastic material, consisting of an elongated tubular guide portion, a flared seed-receiver portion at the upper end of said tubular portion having an opening in its top to receive seed from the seed discharge means on the hopper, spaced attaching elements on said hopper discharge means, the seed-receiver portion of said tube having apertures therein spaced a distance less than the spacing between said attaching elements and stretchable to position said apertures in registry with said attaching elements, whereby said receiver portion is attachable to said discharge means.

2. For use in seed dispensing apparatus including a hopper, a device comprising discharge means, a molded unitary seed-receiver and guide tube made of elastic material, consisting of an elongated tubular guide portion, an enlarged seed-receiver portion at the upper end of said tubular portion extending forwardly and rearwardly of the hopper and having an opening at its top to receive seed from the hopper, said receiver being connectable to the discharge means centrally of said receiver and having auxiliary seed-receiving openings forwardly and rearwardly of said discharge means, and a closure for one of said last mentioned openings yieldable to permit access to the receiver.

3. The invention set forth in claim 2, wherein the closure comprises a pair of flexible flaps extending inwardly from opposite walls of said receiver and yieldable to permit access thereto.

4. The invention set forth in claim 3, wherein said flaps are molded integrally with the walls of the receiver.

5. The invention set forth in claim 4, wherein the unitary seed-receiver and guide tube is molded of rubber.

References Cited in the file of this patent

UNITED STATES PATENTS

| 105,690 | Ingells | July 26, 1870 |
| 256,404 | Straughn | Apr. 11, 1882 |
| 308,899 | Keller | Dec. 9, 1884 |
| 770,245 | Roby | Sept. 13, 1904 |
| 1,292,162 | Van Amburgh | Jan. 21, 1919 |